United States Patent [19]

Iwama et al.

[11] Patent Number: 4,726,640
[45] Date of Patent: Feb. 23, 1988

[54] OPTICAL DEFLECTOR WITH A PNEUMATIC AND A MAGNETIC BEARING

[75] Inventors: Akihiko Iwama, Yokohama; Hiroki Tajima; Mitsuo Suzuki, both of Tokyo, all of Japan

[73] Assignees: Ricoh Company, Ltd., Tokyo; Tohoku Ricoh Company, Ltd., Shibata, both of Japan

[21] Appl. No.: 911,110

[22] Filed: Sep. 24, 1986

[30] Foreign Application Priority Data

Sep. 24, 1985 [JP] Japan .................. 60-210563
Mar. 19, 1986 [JP] Japan ............... 61-40233[U]
Mar. 26, 1986 [JP] Japan ............... 61-44258[U]

[51] Int. Cl.⁴ .................. G02B 26/08; H02K 5/16
[52] U.S. Cl. ......................... 350/6.8; 310/90.5; 350/486
[58] Field of Search ............... 350/6.5, 6.7, 6.8, 486; 310/90.5

[56] References Cited

U.S. PATENT DOCUMENTS

| | | | |
|---|---|---|---|
| 3,791,704 | 2/1974 | Perper | 310/90.5 |
| 4,153,993 | 5/1979 | Kataoka et al. | 310/90.5 |
| 4,154,489 | 5/1979 | Lyman | 310/90.5 |
| 4,303,281 | 12/1981 | Irby | 310/90.5 |
| 4,443,043 | 4/1984 | Yamaguchi | 350/6.5 |
| 4,523,800 | 6/1985 | Yamashita et al. | 350/6.7 |
| 4,538,081 | 8/1985 | Kamiya et al. | 310/90 |

Primary Examiner—Bruce Y. Arnold
Assistant Examiner—Vincent J. Lemmo
Attorney, Agent, or Firm—Oblon, Fisher, Spivak, McClelland & Maier

[57] ABSTRACT

An optical deflector for deflecting a laser beam from a laser by rotating a polygon mirror uses a dynamic pressure pneumatic bearing as a radial bearing and a magnetic bearing as a thrust bearing. The deflector includes a hollow rotor rotatable integrally with the mirror, a stationary shaft received in said hollow rotor, a casing member accommodating the rotor and stationary shaft, and an annular rotor magnet assembly mounted on the outer periphery of the rotor. A first rotary magnet is mounted in an upper end portion of a rotary shaft and a first stationary magnet in an upper end portion of the stationary shaft in such a manner as to face each other with the same polarity, a repulsive force acting between the two magnets serving as a thrust magnetic bearing. A second stationary magnet is arranged to face the first rotary magnet with the same polarity. Further, a second rotary magnet is mounted in a lower end portion of the rotary shaft and a third stationary magnet in a lower end portion of the stationary shaft in such a manner as to face each other with the same polarity.

10 Claims, 13 Drawing Figures

OPTICAL DEFLECTOR WITH A PNEUMATIC AND A MAGNETIC BEARING

BACKGROUND OF THE INVENTION

The present invention relates to an ultraminiature optical deflector which uses a coreless flat DC brushless motor and is suitable for use with an optical data processing apparatus equipped with a lazer deflector, e.g. a laser printer, a digital copier and a facsimile apparatus. More particularly, the present invention is concerned with a deflector which uses a dynamic pressure pneumatic bearing as a radial bearing and a magnetic bearing as a thrust bearing so as to enhance rigidity of the magnetic bearing associated with a lifting force by simple means. Such a deflector is operable stably against unusual external disturbances and achieves an extended service life with wear due to contact of a rotary body being eliminated.

Various kinds of optical data processing apparatuses which are equipped with a laser deflector are known in the art, e.g. a laser printer, a digital copier, a facsimile terminal, and an image scanner of a POS terminal. Equipments generally used to scan bills, ion sheets and others to locate their defects and other various kinds of optical equipments such as for measuring lengths are also provided with an optical deflector. Typically, any of such laser or optical deflectors is implemented with a polygon mirror. A deflector of the type using a polygon mirror is capable of reading or writing information rapidly and accurately since it deflects a light beam at high speed and, yet. continuously.

However, the problem with a picture output terminal with such a laser deflector, e.g. a laser printer is that a picture involves jitter due to irregular rotations of the polygon mirror.

Optical deflectors known in the art include a magnet field system DC brushless motor type deflector in which a thrust magnetic bearing for a rotary body is implemented with a bearing of the kind utilizing repulsive forces of permanent magnets. Specifically, in such a particular type of deflector, a rotor of a DC brushless motor is constituted by a cylindrical magnet, and a hollow shaft provided with a rotatable polygon mirror is rigidly connected to the inner periphery of the rotor magnet. A stationary shaft is disposed inside the hollow rotary shaft, or so-called polyhedron, so that the outer periphery of the stationary shaft cooperates with the inner periphery of the polyhedron to constitute a dynamic pressure pneumatic bearing. A polygon mirror type deflector implemented with such a dynamic pressure pneumatic bearing is constructed such that when a power source is turned on the rotary body with a rotary polygon mirror or the like begins to rotate. Upon lapse of several seconds, a thrust pneumatic bearing set up beforehand becomes effective so that the rotary body reaches a predetermined rotation speed which allows it to lift itself while sustaining an axial load thereof. Under this condition, air flows into and from below the gap defined between the inner periphery of the polyhedron and the outer periphery of the fixed shaft and, due to a pumping function of herringbone grooves formed in an upper and a lower journals, serves to firmly support the rotary body in the radial direction. While supporting the rotary body so, the air flows upwardly due to the effect of spiral grooves so as to exert a pressure upwardly on a thrust stop portion and, then, flows further upwardly out of the dynamic pressure pneumatic bearing via a through opening of the thrust stop portion. By such a procedure, the rotary body which carries the polyhedron therewith is rotated.

A prior art deflector with the above-described kind of pneumatic bearing has various drawbacks as will be described hereinafter.

First, the pneumatic bearing section, e.g., outer periphery of the stationary shaft requires complicated grooving work while the inner periphery of the elongate polyhedron, too, needs very accurate surface machining. For these reasons as well as others, machining processes are difficult to perform and, therefore, add to the production costs.

Second, concerning a dynamic pressure pneumatic bearing, the bearing section is held in a contact state and, hence, the pneumatic bearing effect is not available at the time of a start with the result that a long life span, which is the most significant advantage of a pneumatic bearing, is unachievable. Specifically, the bearing section wears at each time of start and stop of operation due to frictional contact thereof.

Third, the wear of the bearing section is aggravated since the motor is of an inner rotor magnetic field system type, i.e., since a rotor is constantly attracted toward a core type stator while the motor is out of operation.

Fourth, the cost situation discussed above as the first problem becomes more severe since the construction of the rotary body is complicated and the number of structural elements is great to render balance correction difficult.

Fifth, the inner rotor type motor is inherently small in inertia to degrade the picture jitter characteristic and, at the same time, makes the deflector bulky due to increase in the length of the rotary shaft.

Sixth, the inner rotor magnetic field system DC brushless motor has to be accompanied by a velocity detector which adds to the intricacy of construction of the stator side as well as to the number of structural elements. The result is the deterioration of reliability and, again, increase in cost.

SUMMARY OF THE INVENTION

It is therefore an object of the present invention to provide an optical deflector with a pneumatic and a magnetic bearings which eliminates various drawbacks particular to the prior art pneumatic bearing type deflector as discussed above.

It is another object of the present invention to provide an optical deflector with a pneumatic and a magnetic bearings which operates with stability and achieves an unprecedented service life.

It is another object of the present invention to provide an optical deflector with a pneumatic and a magnetic bearings which are simple in construction and feasible for miniaturization.

It is another object of the present invention to provide a cost-effective optical deflector with a pneumatic and a magnetic bearings.

It is another object of the present invention to provide an optical deflector with a pneumatic and a magnetic bearings which has a good picture jitter characteristic.

It is another object of the present invention to provide a generally improved optical deflector with a pneumatic and a magnetic bearings.

In accordance with the present invention, there is provided an optical deflector which deflects light issuing from a light source by rotating a mirror, comprising a hollow rotary shaft rotatable integrally with the mirror which is mounted on the outer periphery of the shaft, an annular rotor magnet assembly mounted on the outer periphery of the rotary shaft adjacent to a lower end of the rotary shaft and magnetized to different polarities sequentially in a circumferential direction, a first rotary magnet mounted in an upper end portion of the rotary shaft, a stationary shaft disposed in the rotary shaft and formed with herringbone grooves on an outer periphery of the stationary shaft, the outer periphery of the stationary shaft and the inner periphery of the rotary shaft constituting a dynamic pressure pneumatic bearing in cooperation, a first stationary magnet mounted in an upper end portion of the stationary shaft to face the first rotary magnet with the same polarity as that of the first rotary magnet, the first rotary magnet and first stationary magnet constituting a thrust magnetic bearing due to a repulsive force acting therebetween, a casing for accommodating and supporting the rotary shaft and stationary shaft, and coils disposed in the casing means to face the rotor magnet assembly, the rotor magnet assembly and coils constituting a motor.

In accordance with the present invention, there is also provided an optical deflector which deflects light issuing from a light source by rotating a mirror, comprising a rotary shaft rotatable integrally with the mirror which is mounted on an outer periphery of the rotary shaft, the rotary shaft being formed with herringbone grooves on the outer periphery, an annular rotary magnet assembly mounted on the outer periphery of the rotary shaft and magnetized to different polarities sequentially in a circumferential direction, a casing for accommodating and rotatably supporting the rotary shaft, the outer periphery of the rotary shaft and an inner periphery of the casing constituting a dynamic pressure pneumatic bearing, a first rotary magnet mounted in an upper end portion of the rotary shaft, a first stationary magnet mounted on the casing means to face the first rotary magnet with a same polarity with the first rotary magnet, the first rotary magnet and first stationary magnet constituting a thrust magnetic bearing due to a repulsive force acting therebetween, a second stationary magnet located to face the first stationary magnet with a same polarity as the first stationary magnet, the first and second stationary magnets constituting a thrust magnetic bearing due to a repulsive force acting therebetween, a cap member connected to the casing for supporting the stationary magnet inside of the cap member, and coils disposed in the casing to face the rotary magnet assembly, the rotary magnet assembly and coils constituting a motor.

The above and other objects, features and advantages of the present invention will become more apparent from the following detailed description taken with the accompanying drawings.

DESCRIPTION OF THE PREFERRED EMBODIMENTS

Figure 1:
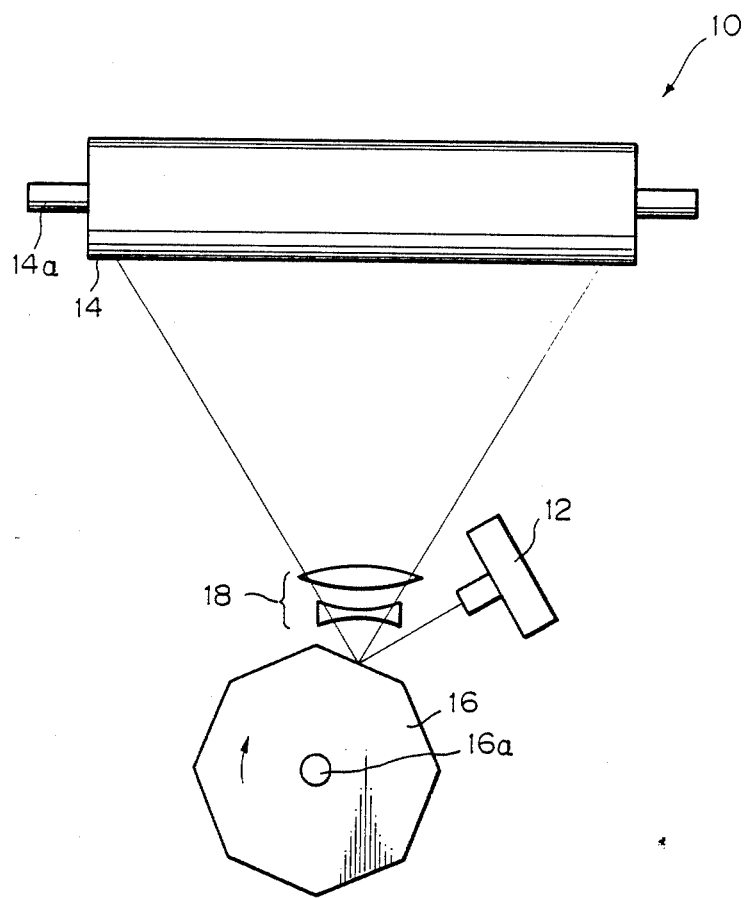
FIG. 1 is a schematic view of a prior art polygon mirror type optical deflector and representative of the principle of an optical arrangement of the deflector.

To better understand the present invention, a brief reference will be made to a prior art polygon mirror type optical deflector, shown in FIG. 1. The prior art deflector, generally 10, includes a laser scanning optical arrangement which consists of a laser unit 12 for selectively emitting a laser beam in response to a digital signal, a photoconductive drum 14, a polygon mirror 16 having a rotary shaft 16a and rotatable to deflect the laser beam in an axial direction of a rotary shaft 14a on which the drum 14 is mounted, and a lens unit 18. A problem with a picture output terminal of the kind using the deflector 10 such as a laser printer is, among others, picture jitter due to irregular rotations of the polygon mirror 16, as previously discussed.

Figure 2A:
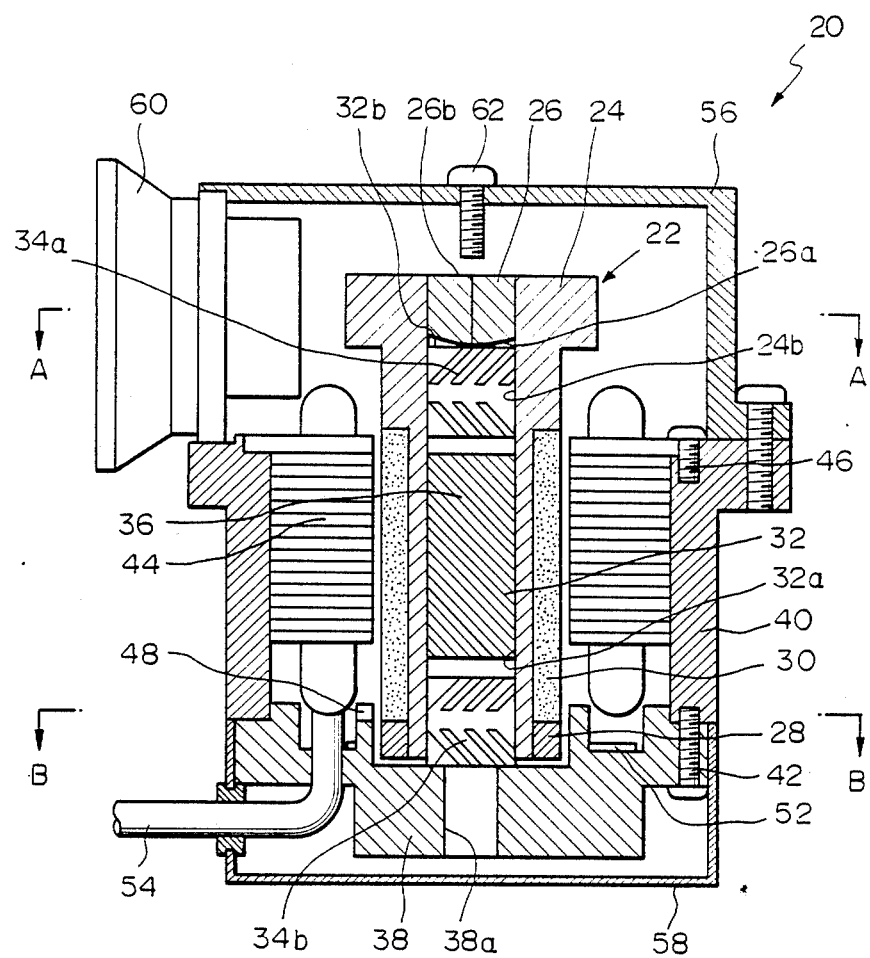
FIG. 2A is a fragmentary vertical section of a prior art polygon mirror type optical deflector which is implemented with a dynamic pressure pneumatic bearing.
Figure 2B:
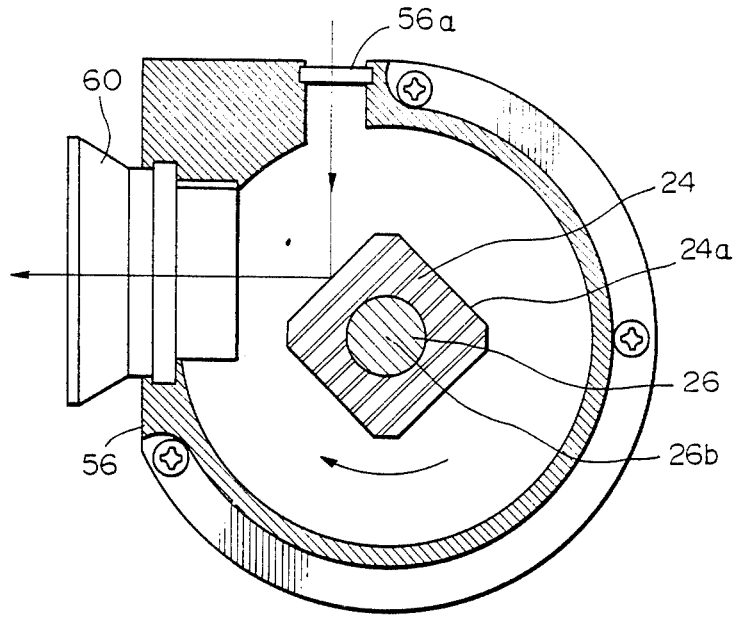
FIG. 2B is a section along line A—A of FIG. 2A.
Figure 2C:
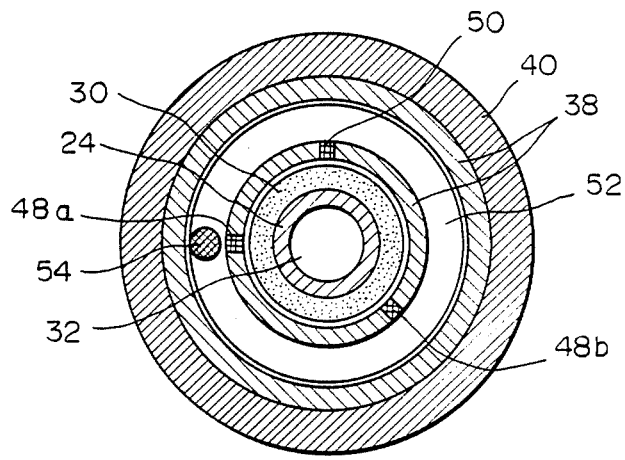
FIG. 2C is a section along ling B—B of FIG. 2A.

Referring to FIGS. 2A to 2C, an example of prior art polygon mirror type deflectors which are implemented with a dynamic pressure pneumatic bearing is shown. As shown, the prior art deflector 20 includes a rotor 22 which is made up of a rotatable polygon mirror 24 having mirror portions 24a, a thrust stop 26, a balance ring 28, and a four-pole rotor magnet 30. A stationary shaft 32 has an outer periphery 32d which is coupled with an inner periphery 24b of the polygon mirror 24 with a small clearance defined therebetween. The upper end 32b of the shaft 32 supports the rotor 22 through a spherical portion 26a of the thrust stop 26. As shown in FIG. 2A, the shaft 32 is formed with herringbone grooves 34a and 34b in an upper and a lower portions thereof, respectively, and spiral grooves 36 in an intermediate portion thereof. As the rotor 22 is rotated as indicated by an arrow in FIG. 2B, it is supported with suitable rigidity in the radial direction by the function of a dynamic pressure pneumatic bearing and, at the same time, allowed to rise axially upwardly released from the upper end 32b of the shaft 32 which has supported it. The thrust stop 26 is provided with a through opening 26b which serves as an air passageway for adjusting the lift of the rotor 22 for a predetermined rotation speed. A lower end portion of the shaft 32 is press-fitted in an inner periphery 38a of an end bracket 38. A casing 40 is concentrically fastened to the end bracket 38 by screws 42.

A stator 44 is fixed to the casing 40 by screws 46 facing the outer periphery of the rotor magnet 30. The stator 44 functions as an armature as well known in the art. As shown in FIG. 2C, a position sensor 48 which is made up of a pair of Hall elements 48a and 48b is provided for sensing positions of the rotor 22, specifically that the rotor magnet 30. A Hall IC element 50 sensitive to rotation speeds is also provided for controlling the rotation of the rotor 22. The Hall element 48 and Hall IC element 50 are mounted on the end bracket 38 and interconnected to leads 54. An upper lid 56 and a lower cover 58 are adapted to hermetically seal the deflector from the outside. As shown in FIG. 2B, the lid 56 is provided with a window 56a for the entry of a light beam, and a lens 60 for focusing a deflected light beam. Designated by the reference numeral 62 is a member for limiting the axially upward movement of the rotor 22.

In the deflector 20 shown in FIGS. 2A to 2C, the magnet field system DC motor is constructed such that a current flows through stator 44, which comprises a core and four field magnetic coils, to develop a torque between the stator 44 and the rotor magnet 30, thereby driving the rotor magnet 30 for rotation. Specifically, as shown in FIG. 2C, the Hall elements 48a and 48b are positioned around the rotor magnet 30 at an angular distance of 135 degrees from each other so as to sense the poles of the rotor magnet 30; the timing for exciting the stator 44 is controlled such that the torque angle constantly remains $\pi/2$. The Hall IC element 50 which is also positioned around the rotor magnet 30 senses the poles of the rotor magnet 30. An output signal of the element 50 is compared in phase with a reference frequency which is generated by a quartz oscillator of a drive circuit, not shown. Based on a result of the comparison, the current to flow through the Hall elements 48a and 48b and, therefore, the rotation speed of the rotor magnet 30 is controlled.

The operation of the deflector 20 will be described with reference to FIG. 2A. As a power source is turned on, the rotor 22 begins to rotate supported by the upper end 32b of the shaft 32. The thrust pneumatic bearing exhibits its function several seconds later than the start of rotation 22, whereby the rotor 22 reaches a predetermined rotation speed at which it is capable of lifting itself while sustaining an axial load thereof. At this instant, air flows into and from below the gap between the inner periphery 24b of the polygon mirror 24 and the outer periphery 32a of the shaft 32. This stream of air firmly supports the rotor 22 in the radial direction due to the pumping function of the herringbone grooves 34a and 34b of the upper and lower journals. While supporting the rotor 22 so, the stream of air is directed upwardly by the spiral grooves 36 to exert an upward force on the thrust stop 26 and, then, forced out of the bearing via the through opening 26b.

The prior art deflector 20 using a dynamic pressure pneumatic bearing constructed and operated as discussed above with reference to FIGS. 2A and 2C has the previously described first to six problems, the bearing failing to fully offer its potential capability.

Figure 3:
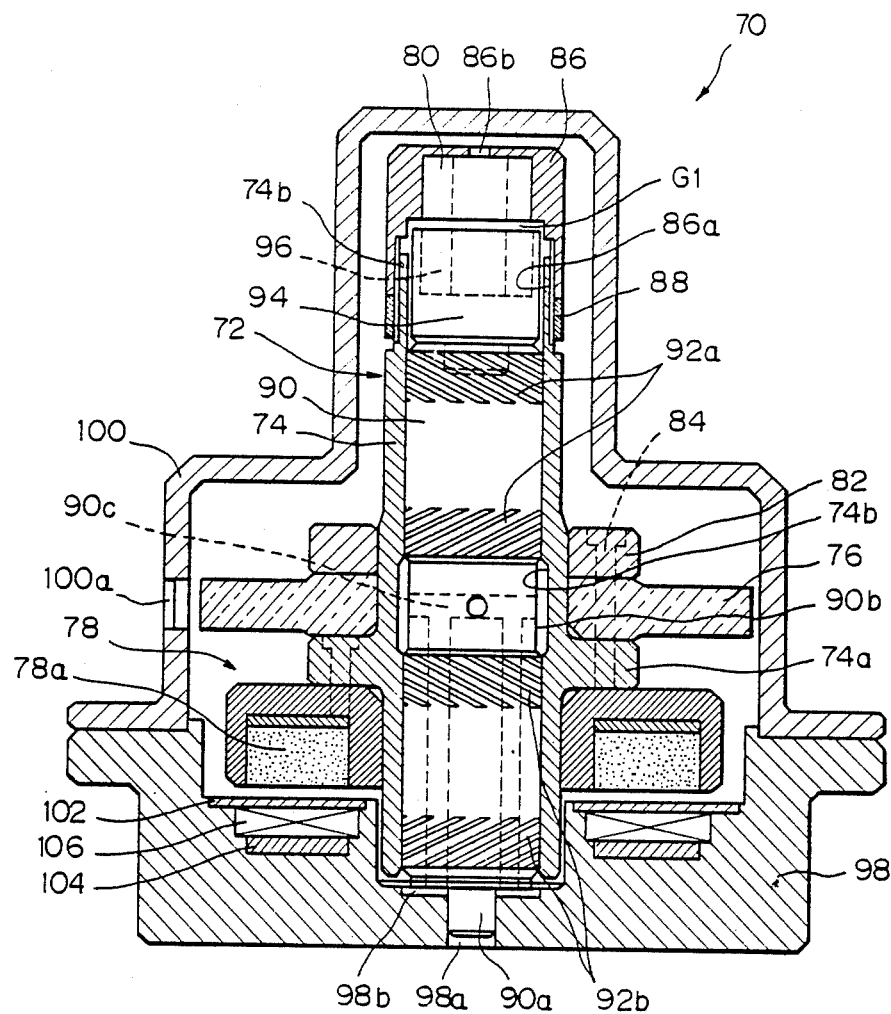
FIG. 3 is a fragmentary vertical section of an optical deflector embodying the present invention.

Referring to FIG. 3, an optical deflector embodying the present invention is shown and generally designated by the reference numeral 70. As shown, the deflector 70 includes a hollow rotary shaft 74, a mirror 76, a rotor assembly 78 having a rotor magnet 78a, and an annular upper magnet 80. The hollow shaft 74 is provided with a flange 74a adapted to support the mirror 76 and rotor assembly 78. Specifically, the mirror 76 is mounted on the flange 74a from above as viewed in FIG. 3 and, while being pressed by a mirror fixing ring 82 from above, fastened by screws 84 to the flange 74a to be thereby fixed in a predetermined position. Disposed below the flange 74a of the hollow shaft 74 is a rotor assembly 78 which constitutes a motor section. A holder case 86 made of a non-magnetic material is fixed to the upper end of the rotary shaft 74 by a ring 88. The holder case 86 serves to support the upper magnet 80 and has a threaded portion 86a which is mated with a threaded portion 74b of the rotary shaft 74. A passageway 86b extends throughout the holder case 86.

In this particular embodiment, a stationary shaft 90 is formed with herringbone grooves 92a and 92b in an upper and a lower portions thereof, respectively. The grooves 92a and 92b serve as a dynamic pressure pneumatic bearing in the radial direction, as described in detail later. A holder case 94 made of a non-magnetic material is rigidly mounted on the top of the stationary shaft 90 by suitable means such as a projection and recess device as in the embodiment. The holder case 94 supports an annular lower magnet 96 which cooperates with the upper magnet 80 as a thrust magnetic bearing. A lug 90a extends from the bottom of the shaft 90 to be received in an opening 98a which is formed in a housing 98, whereby the shaft 90 is fixed in a predetermined position.

The stationary shaft 90 and the rotary shaft 74 are provided with annular recesses 90b and 74b, respectively, so that an annular space is defined between the shafts 90 and 74. A communication passageway 9c adapted for the adjustment of pneumatic pressure is formed in the shaft 90 and opened at the bottom of the shaft 90. The bottom of the shaft 90 covers a groove portion 98b of the housing 98, thereby defining an annular space. The communication passageway 90c mentioned above sets up communication between those annular spaces. Specifically, the passageway 90c is configured such that its ports opening in the radial direction and the space defined by the grooved portion 98b are communicated to each other. The passageway 90c serves the function of equalizing the pressure inside the annular space defined by the recesses 90b and 74b to the pressure inside a housing assembly.

The housing assembly stated above consists of the housing 98 and an upper casing 100 which is formed with a window 100a in alignment with the mirror 76. A coil base 102 and a yoke 104 are rigidly mounted on the housing assembly. Coils 106 which serve as a stator of a motor drive section are bonded to the coil base 102. The clearance between the upper casing 100 and the mirror 76 is designed small enough to eliminate adverse effects of a stream of air. Further, a radially intermediate portion of the upper casing 100 is protruded to faciliate mounting work and transportation.

The permanent magnet repulsion type thrust magnetic bearing installed in the deflector 70 is constructed as follows. The upper magnet 80 mounted on the rotary shaft 74 and the lower magnet mounted on the stationary shaft 90 are arranged such that their same poles face each other to repulse each other. In this instance, the gap G1 between the magnets 80 and 96 is adjustable by rotating the ring 88 and, thereby, moving the holder case 86.

The motor drive section is made up of the magnet rotor assembly 78, coils 106 arranged on the coil base 102, and yoke 104.

Figure 4:
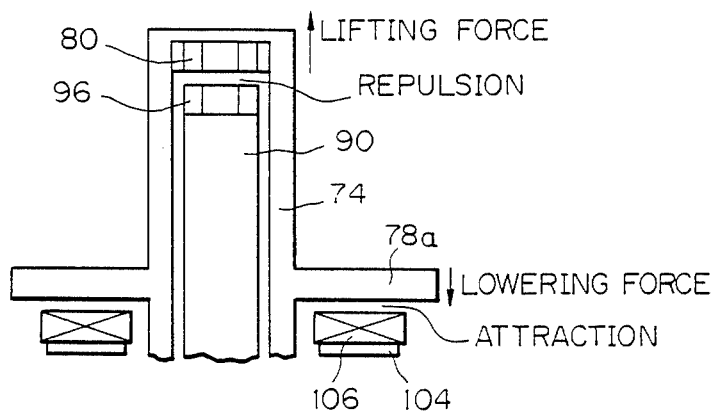
FIG. 4 is a schematic view representative of the principle of operation of a thrust bearing section which is included in the deflector of FIG. 3.

Referring to FIG. 4, the principle of operation of the thrust bearing section of the deflector 70 is schematically shown. In FIG. 4, the same structural elements as those shown in FIG. 3 are designated by like reference numerals. As shown, the thrust bearing section is made up of the annular upper magnet 80, lower magnet 96, rotor magnet 78a included in the motor drive section, and yoke 104. A lifting force is generated by repulsion between the upper and the lower magnets 80 and 96 to cause the rotor 72 to lift itself upwardly. On the other hand, a force tending to pull the rotor 72 downwardly is generated by attraction between the rotor magnet 78a and the yoke 104. The hollow rotor 72 can rise as mentioned if the force acting between the magnets 80 and 96 is greater than the force acting between the rotor magnet 78a and the yoke 104 plus the weight of the rotor 72. A desired intensity of lifting force which balances with the attraction force is attainable by rotating the ring 88 to move the holder case 86 and, thereby, adjust the gap G1.

Figure 5:
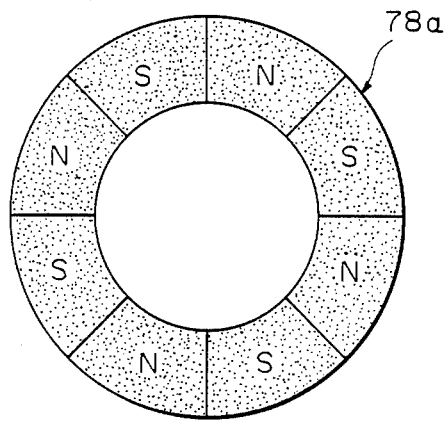
FIG. 5 is a plan view showing a specific configuration of a rotor magnet which is applicable to the deflector of FIG. 3.

FIG. 5 shows a specific and preferable arrangement of the coils 106 of the deflector 70 in accordance with this particular embodiment.

Figure 6:
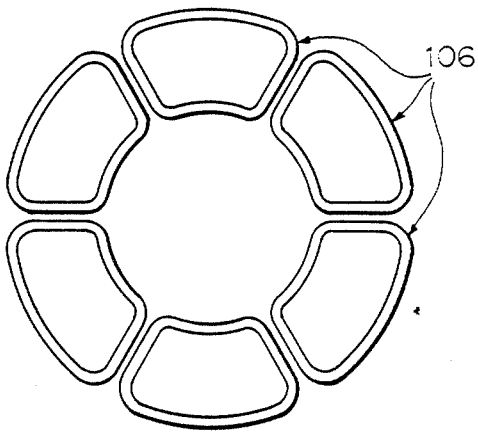
FIG. 6 is a view similar to FIG. 5, showing a specific arrangement of coils also applicable to the deflector of FIG. 3.

Concerning motor control, as shown in FIGS. 5 and 6, the motor drive section of the deflector 70 has an eight-pole, three-phase and six-coil configuration. As the six coils are sequentially excited by switching the excitation phase in response to an output signal of a rotor position sensor, not shown, the rotor is rotated according to Fleming's left-hand rule (so-called Bli rule). As regards the Bli rule, $F=Bli$ (where F is a resultant force, B a magnetic flux density, and i an exciting current) is representative of a force which acts on a coil. In this particular embodiment, however, the torque acting on the rotor magnet, or rotor, is opposite in direction to the Bli rule since the deflector 70 employs the principle of a brushless motor in which coils are stationary and a rotor magnet is rotatable.

As shown and described, the rotor magnet 78a installed in the deflector 70 is implemented with a flat annular magnet which makes it possible to reduce the axial length of the rotor 72. Such enhances a simple and low-cost design of the motor drive section.

Meanwhile, a deflector with a pneumatic and a magnetic bearings as described above is so accurate and delicate in structure that elevations of temperature of the deflector itself are apt to cause various portions of the deflector to be thermally deformed, effecting the balance of the rotary body and, thereby, the jitter characteristic and others of the deflector.

Figure 7:
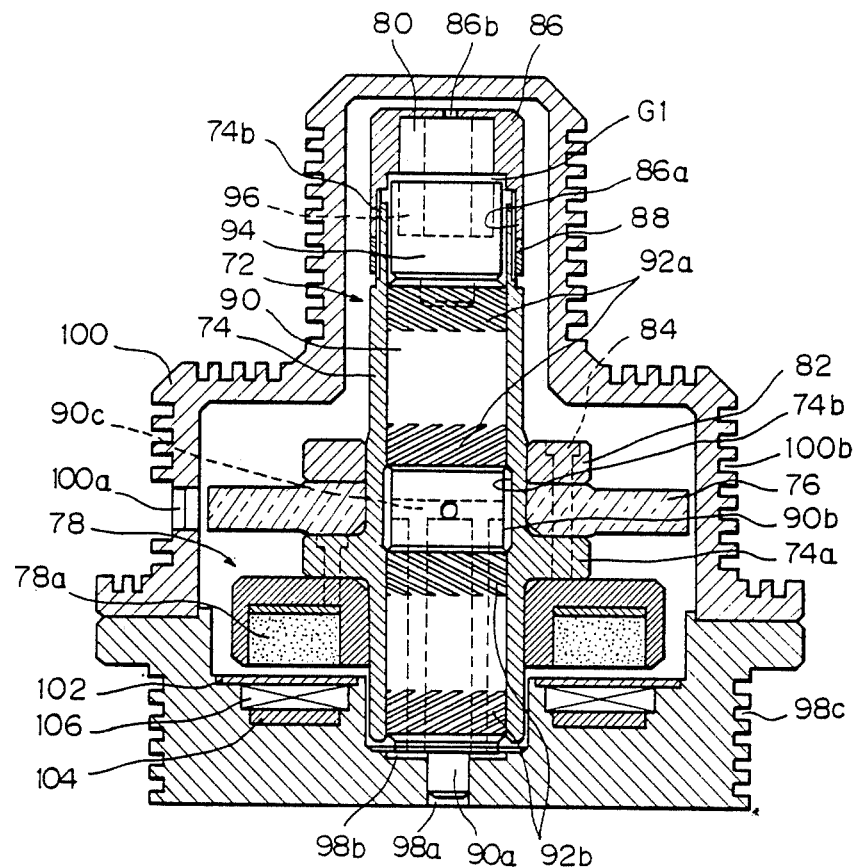
FIG. 7 is a vertical section of a modification to the embodiment of FIG. 3.

In this particular embodiment, therefore, a few unique measures are taken for the radiation of heat. First, the yoke 104 is implemented with a laminate of a plurality of magnetic plates so as to reduce iron loss. Second, as shown in FIG. 7, the housing 98 and the upper casing 100 are respectively provided with fins 98c and 100b for heat radiation on the outer peripheries thereof. Third, the coils 106 and coil base 102 are molded by an insulating and highly heat-conductive resin so that heat generated by the coils 106 may be transferred to the housing 98 via the resin without touching air, which is poor in heat conductivity. By these measures, heat generated in the coils 106 is rapidly transferred to the atmospheric air. Another advantage attainable with the resin molding is that the coils 106 and coil base 102 remain stable against vibrations.

The expedients for heat radiation shown and described serve not only to cope with externally derived disturbances but also to suppress temperature elevation of the deflector itself as far as possible, adding to the stability of operation of the deflector.

Figure 8:
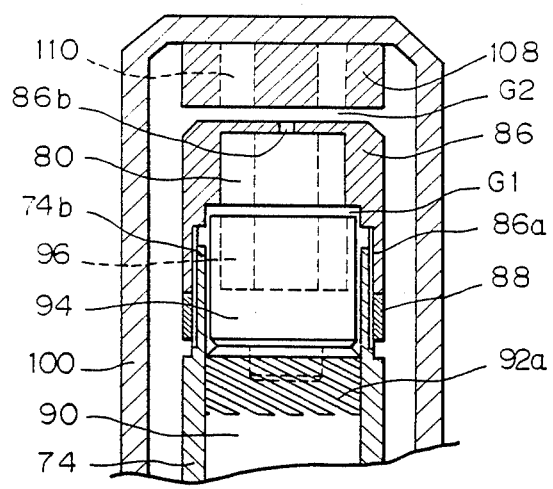
FIG. 8 is a fragmentary vertical section of another modification to the embodiment of FIG. 3.

Referring to FIG. 8, a modification to the deflector 70 is shown and includes a third magnet 110 in addition to the upper and lower magnets 80 and 96. Specifically, the third magnet 110 is mounted on a holder case 108 with a gap G2 defined between itself and the upper magnet 80. The holder case 108 is rigidly mounted on the underside of a top wall of the upper casing 100 and made of a non-magnetic material. The magnet 110, like the others, is provided with an annular configuration. The magnets 110 and 80 are so arranged as to have their same polarities facing each other so that a repulsive force may be developed therebetween. In this manner, the magnets 110, 80 and 96 are arranged in a sandwitch structure and their polarities are selected.

The lift developing between the magnets 110 and 80 and that developing between the magnets 80 and 96 are selected to be greater than the attractive force acting between the rotor magnet 78a and the yoke 104 plus the weight of the rotor. In this construction, the intermediate magnet, i.e., upper magnet 80 is held between and spaced from the other magnets 110 and 96 and, hence, the hollow shaft 74 which is conjoint with the magnet 80 is held in a non-contact state. Moreover, the thrust rigidity of such a construction is far higher than that attainable with the construction of FIG. 3 wherein the upper thrust magnetic bearing is constituted by two magnets. This ensures stable operation of the deflector with no regard to external disturbances which may occur during operation of the deflector.

Figure 9:
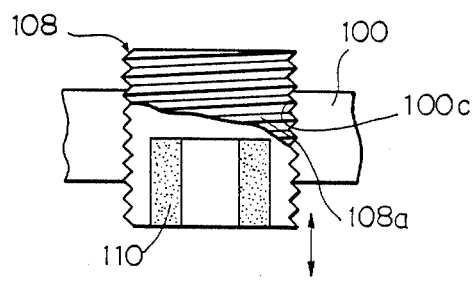
FIG. 9 is a fragmentary vertical section showing a modified form of the arrangement of FIG. 8.

FIG. 9 shows a modified form of the construction as shown in FIG. 8. In FIG. 9, the holder case 108 is provided with a threaded portion 108a on the outer periphery thereof while the upper casing 100 is formed with a threaded opening 100c through the top wall thereof to receive the portion 108a of the holder case 108. The arrangement of FIG. 9 allows not only the gap G1 between the magnets 80 and 96 but also the gap G2 between the magnets 110 and 80 to be adjusted as desired.

Figure 10:
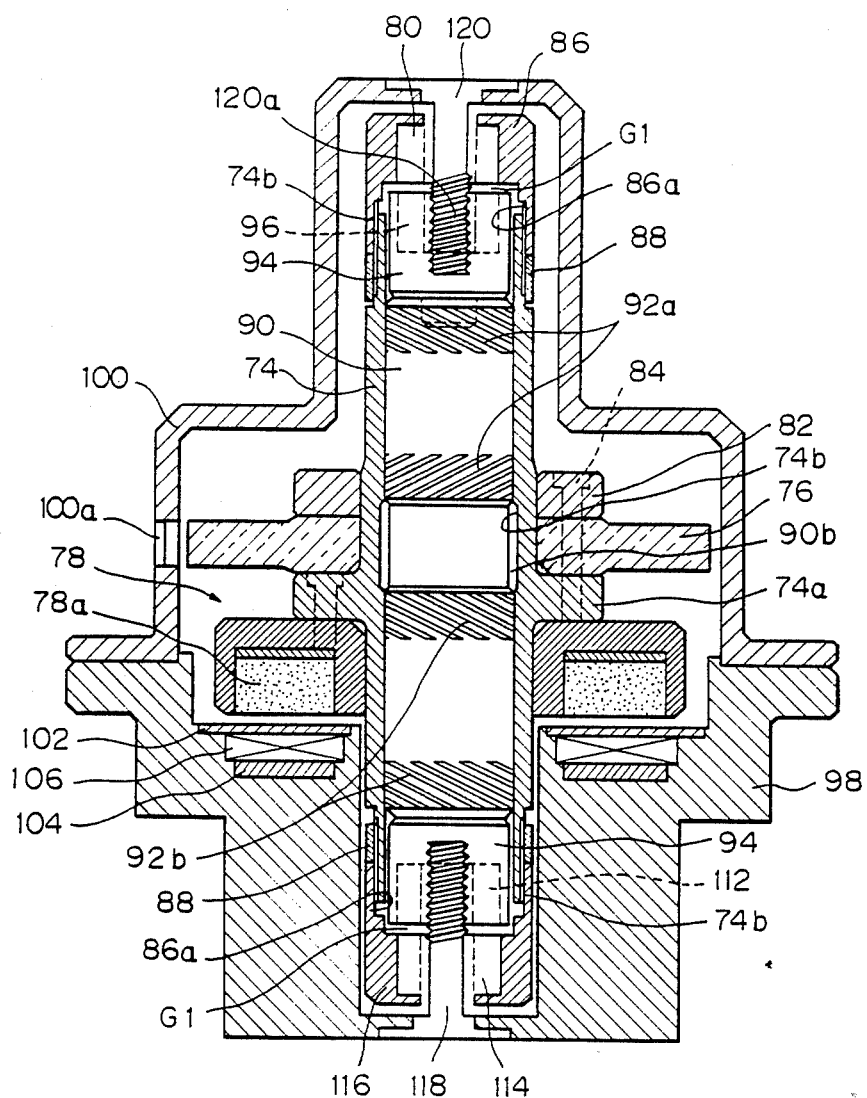
FIG. 10 is a vertical section showing still another modification to the embodiment of FIG. 3.

Referring to FIG. 10, still another modification to the embodiment of FIG. 3 is shown and includes two magnets 112 and 114 in addition to the magnets 80 and 96. Specifically, the magnets 112 and 114 which are similar to the magnets 80 and 96 in shape are mounted in a lower end portion of the hollow rotary shaft 74. Concerning the polarity, the magnets 112 and 114 are arranged relative to each other in the same manner as the others. The magnet 114 is fixed in place at the lower end of the shaft 74 by a holder case 116 which is made of a non-magnetic material.

In the modification shown in FIG. 10, because the rotary shaft 74 is hollow, the stationary shaft 90 which is provided with the magnets 96 and 112 at opposite ends thereof is fixed to the housing 98 and the upper casing 100 by elongate members 118 and 120, respectively. Specifically, the elongate member 118 is rigidly received in the bottom of the housing 98 to support the lower end of the shaft 90 at its tip. The elongate member 120, on the other hand, is rigidly received in the upper casing 100 and provided with a threaded portion 120a at its tip which is received in a threaded bore, no numeral, of the stationary shaft 90, thereby fixing the upper end of the shaft 90 to the upper casing 100. Thus, the arrangement of FIG. 10 includes another thrust magnetic bearing which is disposed in a lower portion of the rotary shaft 90.

In the specific construction shown in FIG. 10, the repulsive force between the magnets 80 and 96, the repulsive force between the magnets 112 and 114, the attractive force between the rotor magnet 78a and the yoke 104, and the weight of the rotor are combined to develop a lifting force, or buoyance, which causes the rotor to lift itself by a predetermined amount. Further, the two thrust magnetic bearings, one disposed in an upper portion of the shaft 74 and the other in a lower portion, further strengthens the thrust bearing rigidity. Therefore, even if the lift of the rotor is effected by any unusual external disturbance while the deflector is in operation, it is immediately restored to normal allowing the deflector to operate with stability.

In the modification of FIG. 10, a pair of magnets is located in an upper portion of the shaft 90 and another pair in a lower portion of the same so as to constitute two thrust magnetic bearings in total. It is needless, however, for each of the thrust bearings to be implemented with a pair of magnets. For example, three magnets may be arranged in an upper portion of the shaft 90 as in the modification of FIG. 8, and two magnets in a lower portion of the same.

Figure 11:
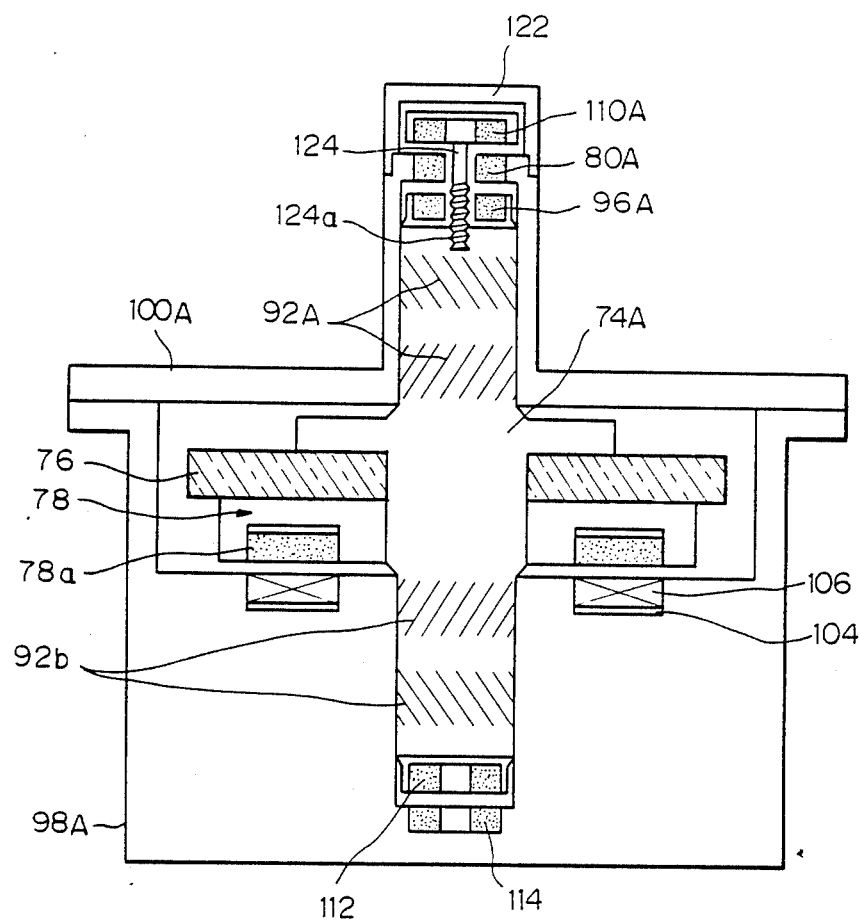
FIG. 11 is a schematic fragmentary vertical section showing a farther modification to the embodiment of FIG. 3.

Referring to FIG. 11, a further modification to the embodiment of FIG. 3 is shown and includes a housing 98A and an upper casing 100A. As shown, a shaft 74A is rotatably supported by the housings 98A and upper casing 100A. It will be seen that the housing 98A and upper casing 100A in combination bifunction as the stationary shaft of any of the embodiment and modifications as shown and described, contributing to the cutdown of the number of structural elements. In this modification, an upper magnet 80A and a lower magnet 96A are disposed above the rotary shaft 74A, and another magnet 110A above the upper magnet 80A. The magnet 110A is accommodated in a cap 122 and supported by an elongate member 124, which has a threaded portion 124a driven into the shaft 74A. The elongate member 124 is adjustable to select a desired lift of the magnet 110A. The rest of the construction and operation is essentially the same as the embodiment and modifications thereto described hereinabove.

In summary, it will be seen that the present invention provides an optical deflector which suppresses contact of a rotatable body with a stationary shaft at the time of start and stop of operation of the deflector since a radial bearing of the deflector is implemented with a dynamic pressure pneumatic bearing and a thrust bearing with a magnetic bearing.

An upper bearing section, i.e., thrust magnetic bearing section maintains the rotary body in a non-contact state with three magnets positioned one above another in a sandwitch structure.

The thrust magnetic bearing section is located above and below the rotary body to sustain the rotary body in a non-contact state. This, coupled with increased bearing rigidity, allows a minimum of wear to occur despite repeated starts and stops of operation, contributing a great deal to the increase in the life of a deflector.

The enhanced thrust rigidity ensures stable rotations of the rotatable body against externally derived disturbances.

Further, configurations of the rotatable body, stationary shaft and others are simpler than those of a prior art arrangement which uses a dynamic pressure pneumatic bearing, cutting down the parts number, promoting the ease of machining and assembly and, yet, reducing the weight of the rotatable body. The result is a miniature and cost-effective deflector.

In addition, the deflector of the present invention is free from irregular rotations and, therefore, picture jitter since it adopts the principle of a coreless flat DC brushless motor.

Various modifications will become possible for those skilled in the art after receiving the teachings of the present disclosure without departing from the scope thereof.

What is claimed is:

1. An optical deflector which deflects light issuing from a light source by rotating a mirror, comprising:
    a hollow rotary shaft rotatable integrally with said mirror which is mounted on an outer periphery of said shaft;
    an annular rotor magnet assembly mounted on the outer periphery of said rotary shaft adjacent to a lower end of said rotary shaft and magnetized to different polarities sequentially in a circumferential direction;
    a first rotary magnet mounted in an upper end portion of said rotary shaft;
    a stationary shaft disposed in said rotary shaft and formed with herringbone grooves on an outer periphery of said stationary shaft, said outer periphery of said stationary shaft and said inner periphery of said rotary shaft constituting a dynamic pressure pneumatic bearing in cooperation;
    a first stationary magnet mounted in an upper end portion of said stationary shaft to face said first rotary magnet with a same polarity as that of said first rotary magnet, said first rotary magnet and first stationary magnet constituting a thrust magnetic bearing due to a repulsive force acting therebetween;
    casing means for accommodating and supporting said rotary shaft and stationary shaft; and
    coil means disposed in said casing means to face said rotor magnet assembly, said rotor magnet assembly and coil means constituting a motor.

2. An optical deflector as claimed in claim 1, further comprising a second stationary magnet mounted on said casing means to face said first rotary magnet with a polarity the same as said first rotary magnet, said first rotary magnet and second stationary magnet constituting a thrust magnetic bearing due to a repulsive force acting therebetween.

3. An optical deflector as claimed in claim 2, further comprising a holder case for holding said second stationary magnet.

4. An optical deflector as claimed in claim 3, further comprising adjusting means for adjusting a gap between said first rotary magnet and second stationary magnet.

5. An optical deflector as claimed in claim 4, wherein said adjusting means comprises a threaded portion provided on an outer periphery of said holder case, and a threaded opening formed in said casing for receiving said threaded portion.

6. An optical deflector as claimed in claim 2, further comprising a second rotary magnet mounted in a lower end portion of said rotary shaft, and a third stationary magnet mounted in a lower end portion of said stationary shaft to face said second rotary magnet with a polarity the same as that of said second rotary magnet, said second rotary magnet and third stationary magnet constituting a thrust magnetic bearing due to a repulsive pulse acting therebetween.

7. An optical deflector as claimed in claim 1, wherein said casing means comprises a lower casing part which supports said stationary shaft at a lower end of said lower casing part, and an upper casing part which accommodates said rotary shaft in a space defined by said upper and lower casing parts.

8. An optical deflector as claimed in claim 7, wherein said upper and lower casing parts are provided with fins for heat radiation on outer peripheries thereof.

9. An optical deflector as claimed in claim 1, further comprising a second rotary magnet mounted in a lower end portion of said rotary shaft, and a second stationary magnet mounted in a lower end portion of said stationary shaft to face said second rotary magnet with a polarity the same as said second rotary magnet, said second rotary magnet and second stationary magnet constituting a thrust magnetic bearing due to a repulsive force acting therebetween.

10. An optical deflector which deflects light issuing from a light source by rotating a mirror, comprising:
- a rotary shaft rotatable integrally with said mirror which is mounted on an outer periphery of said rotary shaft, said rotary shaft being formed with herringbone grooves on said outer periphery;
- an annular rotary magnet assembly mounted on said outer periphery of said rotary shaft and magnetized to different polarities sequentially in a circumferential direction;
- casing means for accommodating and rotatably supporting said rotary shaft, said outer periphery of said rotary shaft and an inner periphery of said casing means constituting a dynamic pressure pneumatic bearing;
- a first rotary magnet mounted in an upper end portion of said rotary shaft;
- a first stationary magnet mounted on said casing means to face said first rotary magnet with a polarity the same as said first rotary magnet, said first rotary magnet and first stationary magnet constituting a thrust magnetic bearing due to a repulsive force acting therebetween;
- a second stationary magnet located to face said rotary magnet with a polarity the same as said first rotary magnet, said first and second stationary magnets constituting a thrust magnetic bearing due to a repulsive force acting therebetween;
- a cap member connected to said casing means for supporting said stationary magnet inside of said cap member; and
- coil means disposed in said casing means to face said rotary magnet assembly, said rotary magnet assembly and coil means constituting a motor.

* * * * *